US008496260B2

(12) United States Patent
Jutkiewicz et al.

(10) Patent No.: US 8,496,260 B2

(45) Date of Patent: Jul. 30, 2013

(54) WHEELCHAIR BAG TRANSPORTING MECHANISM

(76) Inventors: Leonard Jutkiewicz, West Milford, NJ (US); Krzysztof Kotapka, Bloomingdale, NJ (US)

( * ) Notice: Subject to any disclaimer, the term of this patent is extended or adjusted under 35 U.S.C. 154(b) by 57 days.

(21) Appl. No.: 12/610,329

(22) Filed: Nov. 1, 2009

(65) Prior Publication Data

US 2011/0233890 A1 Sep. 29, 2011

(51) Int. Cl.

| | |
|---|---|
| ***A61G 5/10*** | (2006.01) |
| ***B62J 9/00*** | (2006.01) |
| ***B62M 1/14*** | (2006.01) |

(52) U.S. Cl.

USPC ........ 280/250.1; 224/282; 224/407; 280/202; 280/288.4; 280/304.1

(58) Field of Classification Search

USPC ......... 280/202, 250.1, 288.4, 304.1; 224/282, 224/407

See application file for complete search history.

(56) References Cited

U.S. PATENT DOCUMENTS

| | | | | |
|---|---|---|---|---|
| 4,580,803 | A * | 4/1986 | Davis | 280/304.1 |
| 4,919,443 | A * | 4/1990 | Kehler | 280/304.1 |
| 5,180,181 | A * | 1/1993 | Letechipia | 280/304.1 |
| 5,299,824 | A * | 4/1994 | Roberts et al. | 280/304.1 |
| 7,344,055 | B2 * | 3/2008 | Macocha | 280/304.1 |
| 7,651,111 | B2 * | 1/2010 | Butler | 280/304.1 |
| 7,845,667 | B2 * | 12/2010 | Mahler et al. | 280/304.1 |
| 2008/0069678 | A1 * | 3/2008 | Mahler et al. | 280/304.1 |
| 2008/0156838 | A1 * | 7/2008 | Johnson | 224/407 |

* cited by examiner

*Primary Examiner* — Kevin Hurley
*Assistant Examiner* — Marc A Scharich

(57) ABSTRACT

A storage apparatus (10) attachable to a wheelchair (44) is pivotable and slidable from a storage position against the back of a wheelchair backrest to an access position adjacent to a wheelchair armrest. Pivoting and sliding is accomplished under power of an operator with the storage apparatus and slide mechanism (11) rotating substantially 90 degrees around vertical pivot member (30) and then sliding on a block member (18). A handle (24) is used to aide with the movement of the storage apparatus and to operate a locking mechanism (28), which secures the storage apparatus in access and storage positions.

14 Claims, 11 Drawing Sheets

WHEELCHAIR BAG TRANSPORTING MECHANISM

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to a movable wheelchair bag, more specifically to improved transportation mechanism of the wheelchair bag.

2. Discussion of Prior Art

Wheelchairs that are commonly used for transportation of persons having difficulty ambulating are not ordinarily equipped with a storage container where occupant could store his/her belongings. Several solutions to that important problem have been proposed and are currently available on the market. The most popular solution remains a bag simply hung in the back of the wheelchair over the push handles. While being an inexpensive and simple solution it does nothing to solve a valid problem of occupant (per definition inflicted with decreased mobility) having to get up and walk around the wheelchair in order to access content of the bag. Another problem is insecure attachment to push handles where the bag is prone to falling off the wheelchair. More secure (tight) attachment is certainly possible but that would make removing and accessing the bag so much more difficult.

Certain containers are manufactured to fit on inside or outside of wheelchair's armrest. Even that convenient access to these containers is secured drawbacks include small size and either decreasing seating space (inside mount) or increasing width of the wheelchair (outside mount). This solution will also invariably interfere with the action of occupant's arm during wheelchair propulsion.

Wheelchair container could also be mounted underneath the wheelchair. Main drawback of this solution is very difficult (often dangerous for the disabled population) access requiring significant bending forward or getting out of the wheelchair and kneeling each time the occupant would like to access his/her belongings. Flat, round container can be mounted on the rim of the wheel. This design will accommodate flat and lightweight objects. Drawbacks include: interfering with the propulsion (mount directly on the wheel), small depth limiting usage to such object like newspapers and magazines, increasing width of the wheelchair and necessity to close the container completely or risking losing the content of the container with each turn of the wheel.

Swinging type of a solid container is commercially available (Have-A-Tray Carrier). This carrier is mounted to the front of the wheelchair and protrudes forward when wheelchair is in motion. To access its content the carrier can be swung to the side of the wheelchair. This design adds to wheelchair dimensions and raises safety concerns, as the container is free to rotate. Possibility of injury to occupant or other people is real. The most practical solution to wheelchair storage seems to be in the back of the wheelchair (unobtrusive and big space fully contained within footprint of the wheelchair). Several attempts were made in the past to design a mechanism, which would conveniently move storage container from (inaccessible) storage location to easily accessible (access) location.

References of general background interest, with respect to present invention, include U.S. Pat. No. 4,919,443 Kehler issued Apr. 24, 1990 which describes swingable wheelchair container mounted in the rear of the wheelchair. This design does not solve the problem of transporting the container from storage to access position. Also while moving between storage and access positions the bag travels significantly beyond the base of the wheelchair. U.S. Pat. No. 5,180,181 Letechipia issued Jan. 19, 1993 which describes motorized movable storage apparatus. This design does not work well when the bag is loaded with belongings, as it would tilt from vertical position due to force of gravity. Again, the bag travels significantly beyond the base of the wheelchair. U.S. Pat. No. 4,580,803 Davis issued Apr. 8, 1986 which describes convenience basket, desktop or tray mounting system for wheelchairs. This design is of value for a wheelchair user who does not have to propel the wheelchair independently as the basket in the stored position would prevent access to one of the wheels. It would be however quite useful for shopping activities granted that the help of the attendant can be obtained.

3. Objects and Advantages

Accordingly, several objects and advantages of our invention are: to provide sizable storage for the wheelchair user

- to provide convenient storage position of the bag in the back of the wheelchair which will not interfere with wheelchair propulsion and movement
- to provide easy access to content of the bag for the wheelchair user while the user remains seated in the wheelchair
- to provide easily engaged and disengaged locks which secure bag during moving of the wheelchair and while accessing content of the bag
- to provide handle to improve ease of operation and afford mechanical advantage of force for disabled or weak wheelchair operator
- to provide wheelchair bag which will not travel significantly beyond the footprints of the wheelchair
- to provide apparatus which is easily attachable to most of the wheelchairs Further objects and advantages are to provide reliable, easily accessible by average wheelchair operator means to store personal belongings. Still further objects and advantages will become apparent from a consideration of the ensuing description and drawings.

SUMMARY

In accordance with the present invention a combination of a wheelchair and a storage apparatus comprising: a wheelchair having a frame including a seat portion, a back support portion, and at least two wheels; a storage apparatus adapted to be placed adjacent and behind said back support portion when not in use and is movable into a position adjacent to said seat portion for easy access when desired; and an arm member attached to said storage apparatus and pivotally attached to said wheelchair frame, such that said storage apparatus can be moved between a position adjacent and behind said back support portion and a position adjacent to said seat portion and one of said at least two wheels.

DRAWINGS—FIGURES

In the drawings, closely related figures have the same number but different alphabetic suffixes.

| | |
|---|---|
| 10 storage apparatus | 18-1 bearing section |
| 11 slide mechanism | 18-2 clamp |
| 12 arm member | 18-3 lock hole |
| 14-1 side bracket | 19-1 linear bearing |
| 14-2 side bracket | 19-2 linear bearing |
| 16-1 slide bar member | 20 cam follower |
| 16-2 slide bar member | 22 handle holder |
| 17-1 lock plunger | 24 handle member |
| 17-2 lock plunger | 26 lock activator |
| 18 block member | 28 locking mechanism |
| 28-1 lock hub | 30 pivot member |
| 28-2 lock pin | 32 post |
| 28-3 spring | 34 upper bracket |
| 28-4 spring stop | 36 lower bracket |
| 36-1 lock hole | 46 drive slide mechanism |
| 36-2 lock hole | 48-1 pivot motor |
| 38 shaft | 48-2 slide motor |
| 40-1 upper bushing | 50 pivoting frame |
| 40-2 lower bushing | 52 tray |
| 42 mounting clamp | 54 tray support |
| 44 wheelchair | 56 electric device |

DETAILED DESCRIPTION—FIGS. 1, 2, 4 AND 5—PREFERRED EMBODIMENTS

Figure 1:
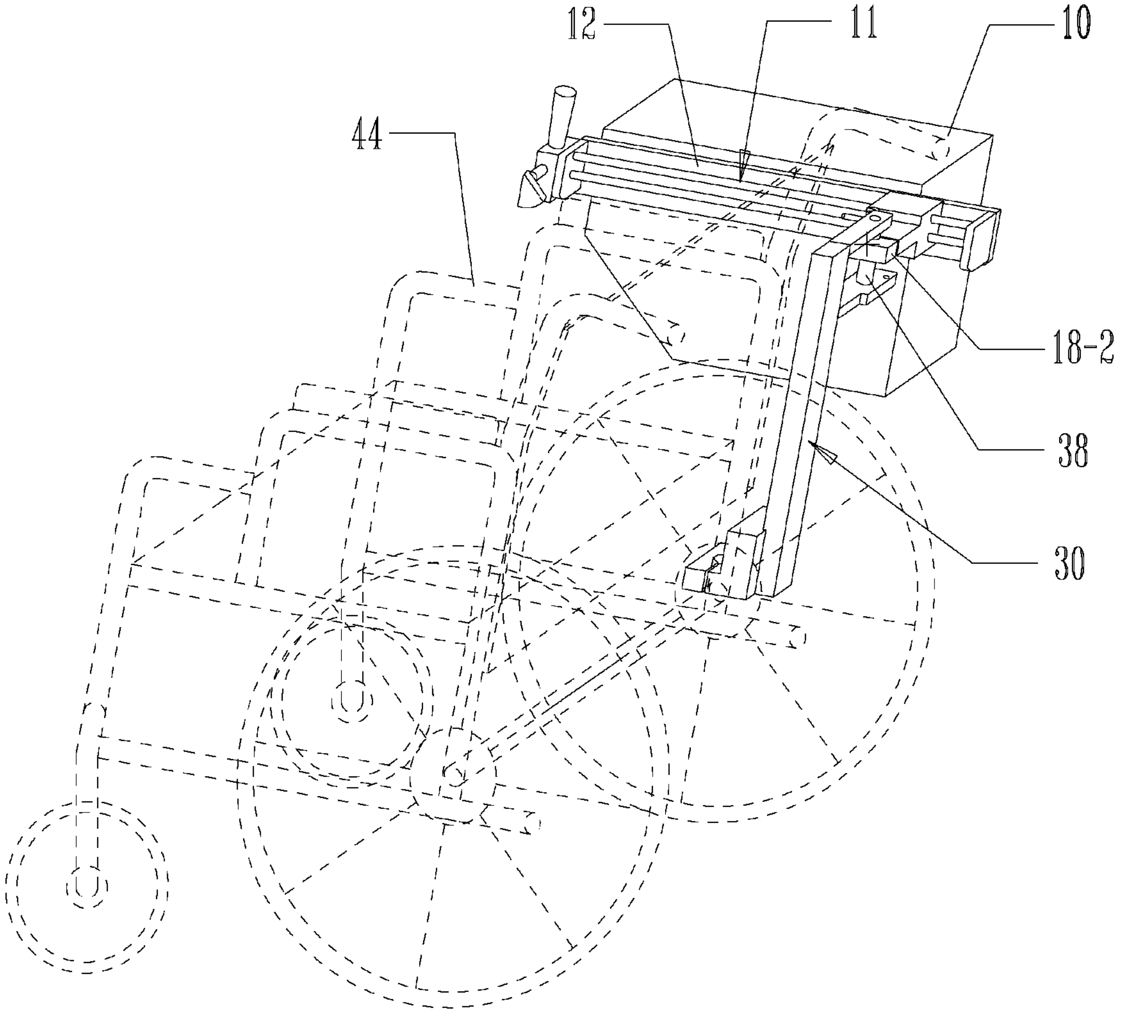
FIG. 1 is a perspective view of the invention attached to a wheelchair with the storage apparatus in the access position alongside wheelchair's armrest
Figure 2:
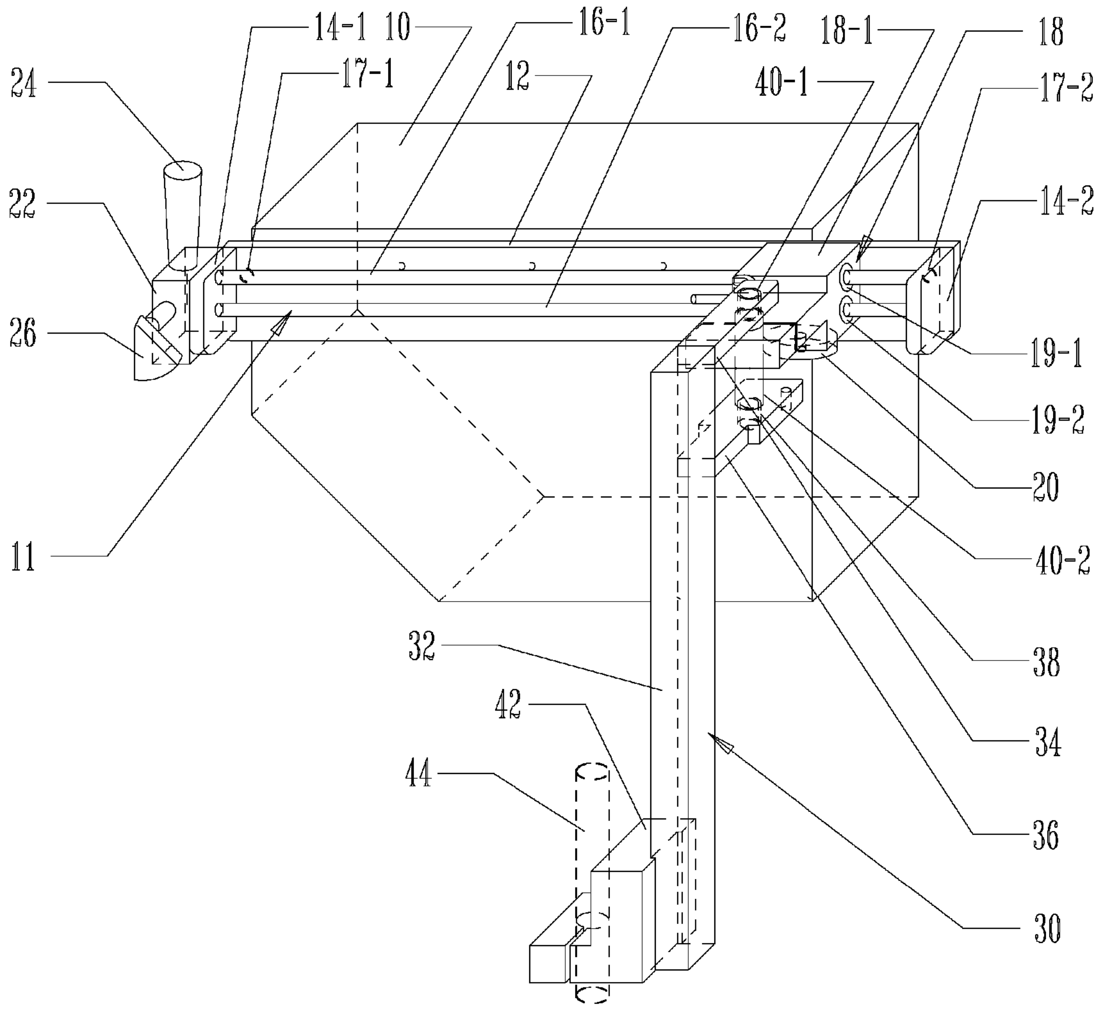
FIG. 2 is a perspective view of the invention

A preferred embodiment of the storage apparatus transportation mechanism of the present invention is illustrated in FIG. 1 and FIG. 2

Figure 4:
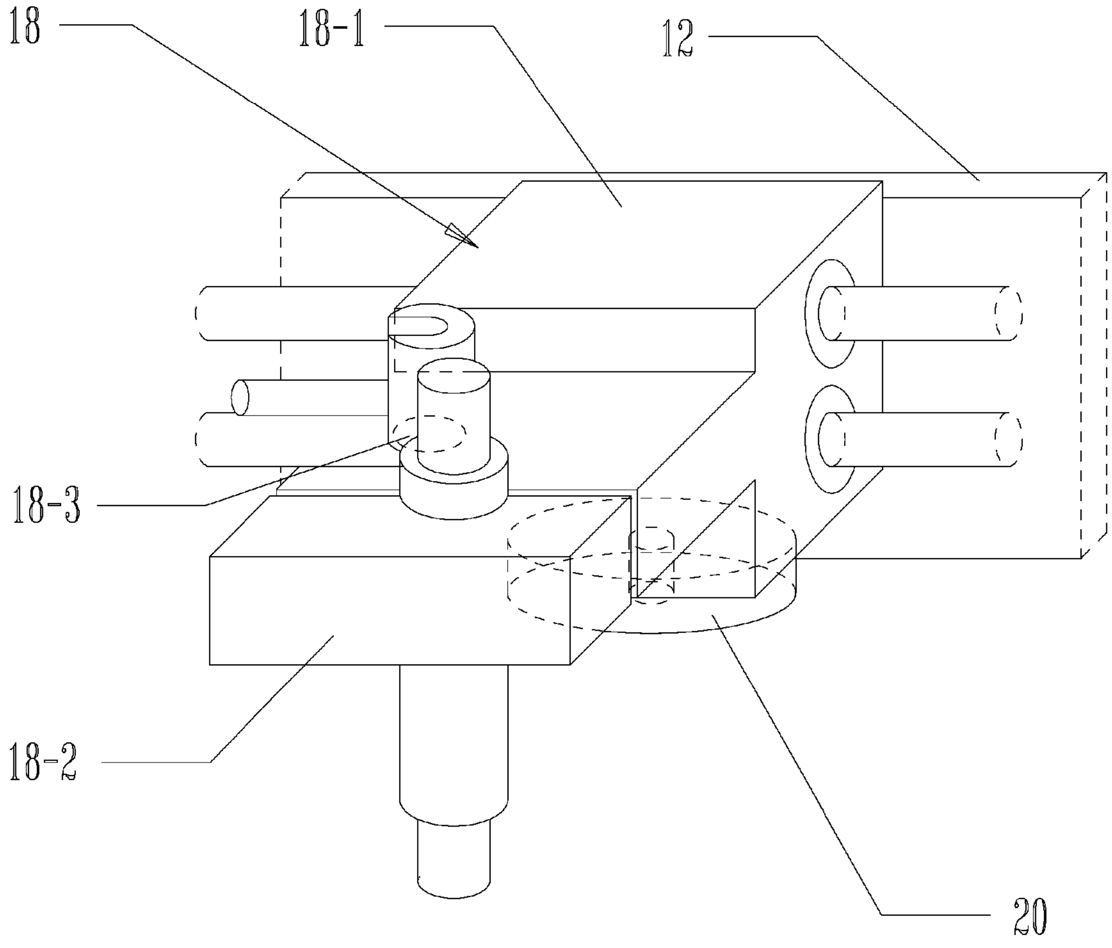
FIG. 4 is a view of a block member
Figure 5:
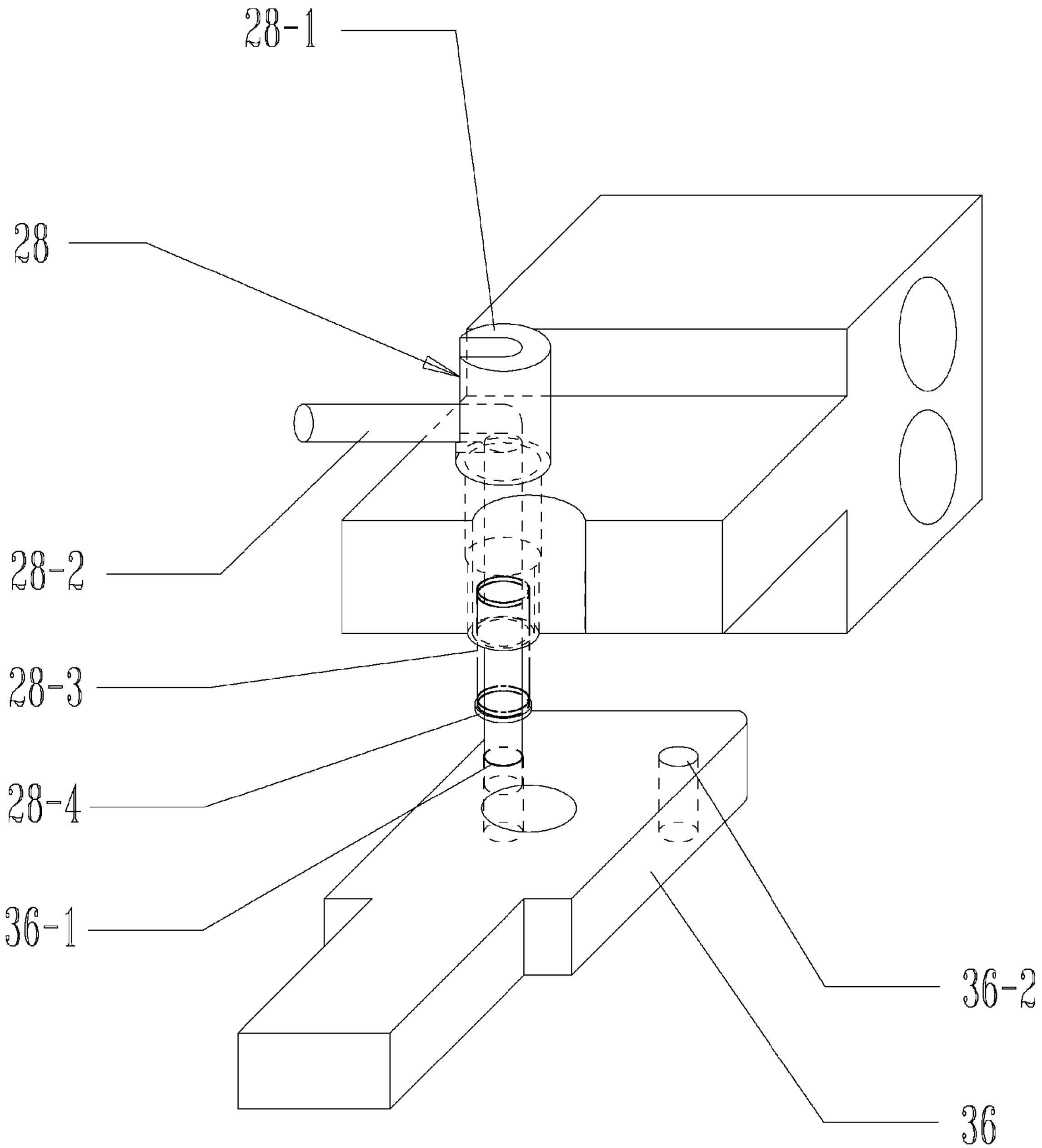
FIG. 5 is a view of a locking mechanism
Figure 6:
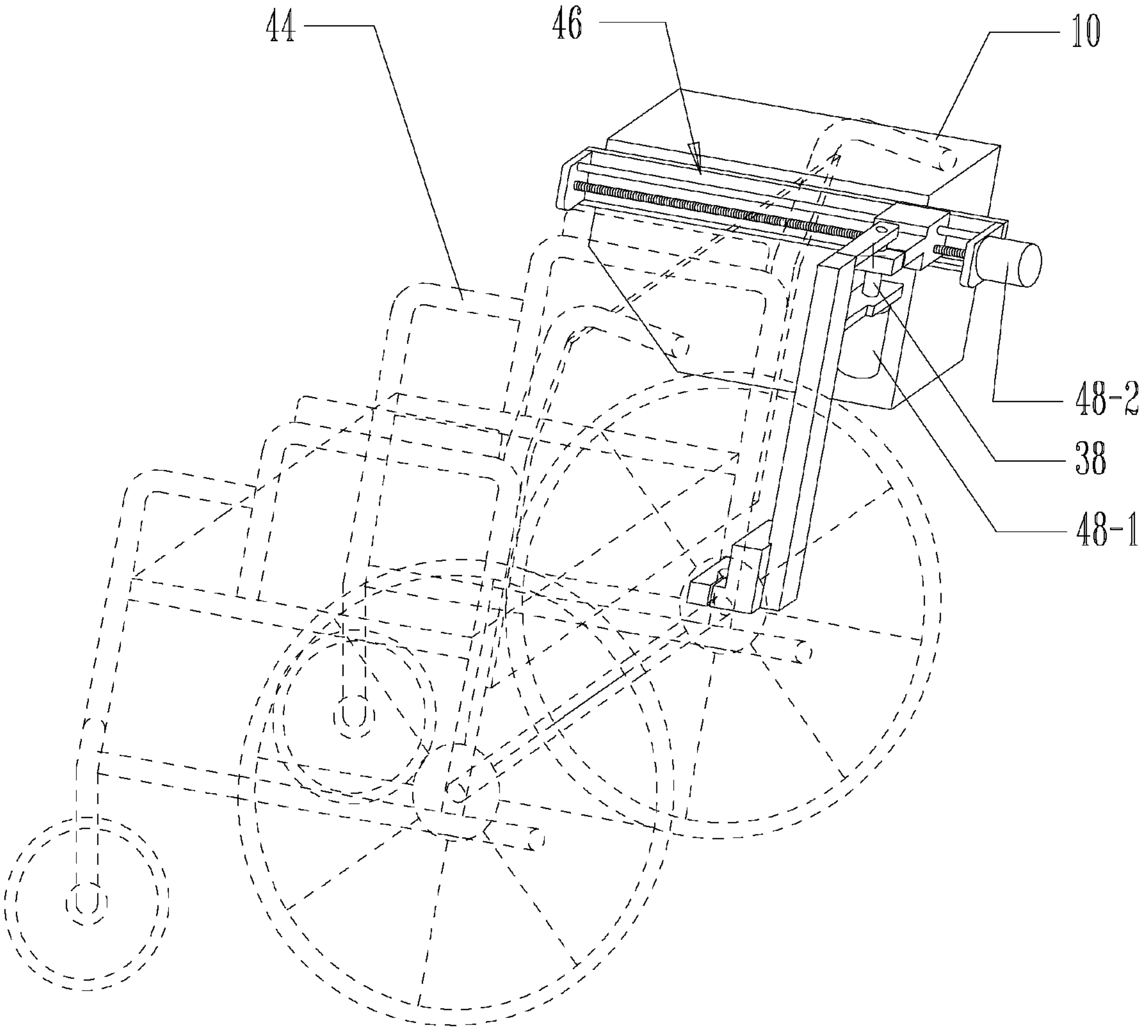
FIG. 6 is a view of the invention with optional power drives
Figure 7A:
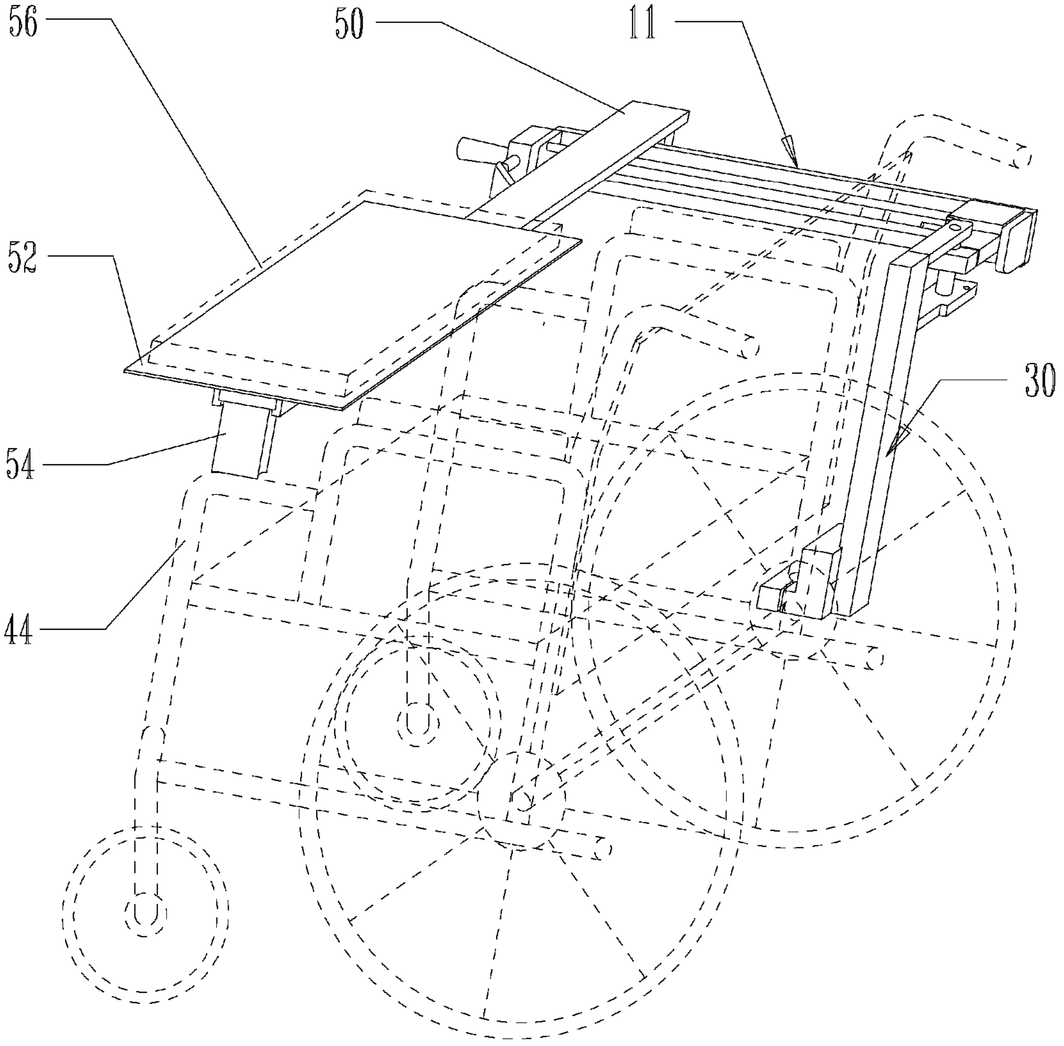
FIGS. 7A to 7C show view of the invention with optional tray in "extended", "folded" and "access" positions DRAWINGS - Reference Numerals

In FIG. 1 a storage apparatus 10 is rigidly attached to an arm member 12. In the preferred embodiment storage apparatus 10 is a nylon bag with stiff backside and one corner deformed for clearing a wheel of a wheelchair. Storage apparatus, however, can be any type of a container made from any material such as plastic, canvas, wood components, leather etc. Any type of mechanism can be in fact mounted to the arm member 12 including portable computer, video or gaming devices. Securing storage apparatus 10 to arm member 12 can be accomplished with bolts or any other fastening method such as pegs, rivets, hooks, loops etc. Alternatively storage apparatus 10 can be removably attached to arm member 12. The arm member 12 is made from any sufficiently stiff and durable material such as metal, plastic or wood components. As shown in FIG. 2 arm member 12 is rigidly connected to a side bracket 14-1 and a side bracket 14-2. The side brackets are connected to a slide bar 16-1 and a slide bar 16-2. The slide bars are pipes or rods, which are parallel to each other and are slidably connected to a bearing section 18-1 of a block member 18 via respective slide bearings 19-1 and 19-2. The slide bars can have other than round shape design, which will permit smooth motion on stationary block member. Alternative design may include mechanism with rolls, wheels or any slidable material such as Teflon or polished metal. Arm member 12 has two lock plungers 17-1 and 17-2 that engage with a surface of bearing section 18-1. Any type of a locking mechanism such as notch, groove, spring, catch or latch can substitute those plungers. The block member 18, best visible in FIG. 4, has the bearing section 18-1 and a clamp 18-2. The bearing section has a cam follower 20 mounted on the bottom in a way that the outermost part of the cam follower contacts the lower part of arm member 12. Cam follower 20 is a wheel with a bearing but could be substituted by any sliding material such as metal, plastic, felt etc. Clamp 18-2 has a lock hole 18-3. In FIG. 1 a slide mechanism 11 is attached to a shaft 38 of a pivot member 30 by clamp 18-2. As seen in FIG. 2 shaft 38 is pivotally mounted between an upper bracket 34 and a lower bracket 36 with bushings 40-1 and 40-2. In FIG. 5 lower bracket 36 has a lock hole 36-1 and a lock hole 36-2. The lock holes engage a lock pin 28-2. In FIG. 2 pivot member 30 has a post 32, which terminates in a mounting clamp 42 to connect with a wheelchair frame 44. Side bracket 14-1 has a handle holder 22 for a handle member 24. A lock activator 26 is connected to the handle member 24. A lock mechanism 28 visible in FIG. 5 has a lock hub 28-1 that contains lock pin 28-2. A spring 28-3 is compressed on lock pin 28-2 with a spring stop 28-4 holding it in place. Different locking methods and mechanisms can be utilized here. For example latch, hook or plunger can substitute pin. Alternatively lock, instead of engaging with lower bracket 36 can engage with upper bracket 34 or directly with shaft 38. FIG. 6 shows an optional power drive, which consists of a pivot motor 48-1, engaged with shaft 38 and a slide motor 48-2, which is mechanically engaged with a drive slide mechanism 46. FIG. 7A shows an optional tray 52 which can be mounted in place of storage apparatus 10 to slide mechanism 11. Tray 52 is slidably connected to a pivoting frame 50, which is pivotably connected to slide mechanism 11. A support 54 connects to tray 52 and rests on wheelchair frame 44. An electric device 56 is mounted to tray 52.

Figure 3A:
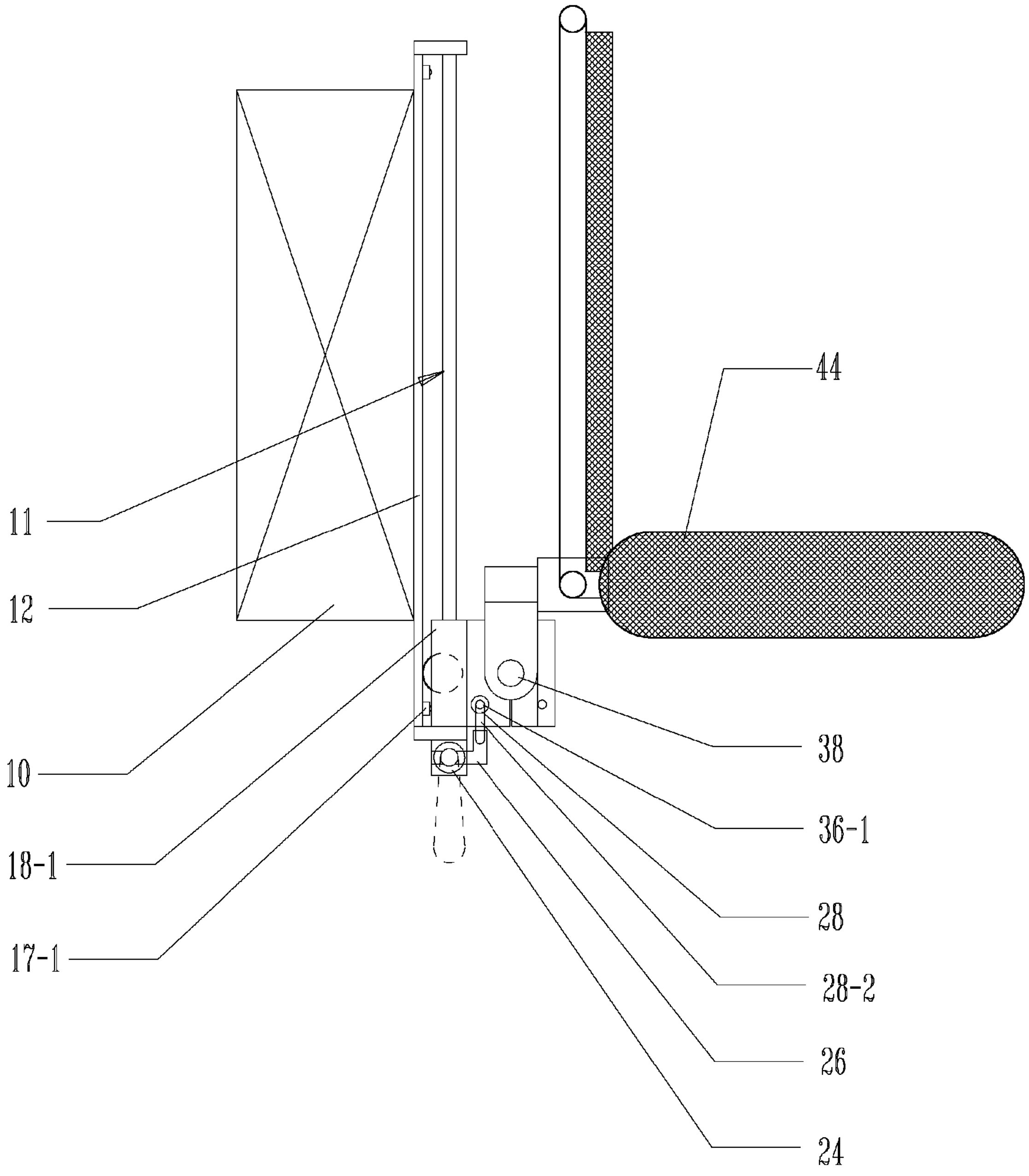
FIGS. 3A to 3C show top view of the storage apparatus traveling from storage through intermediate to access positions.
Figure 3B:
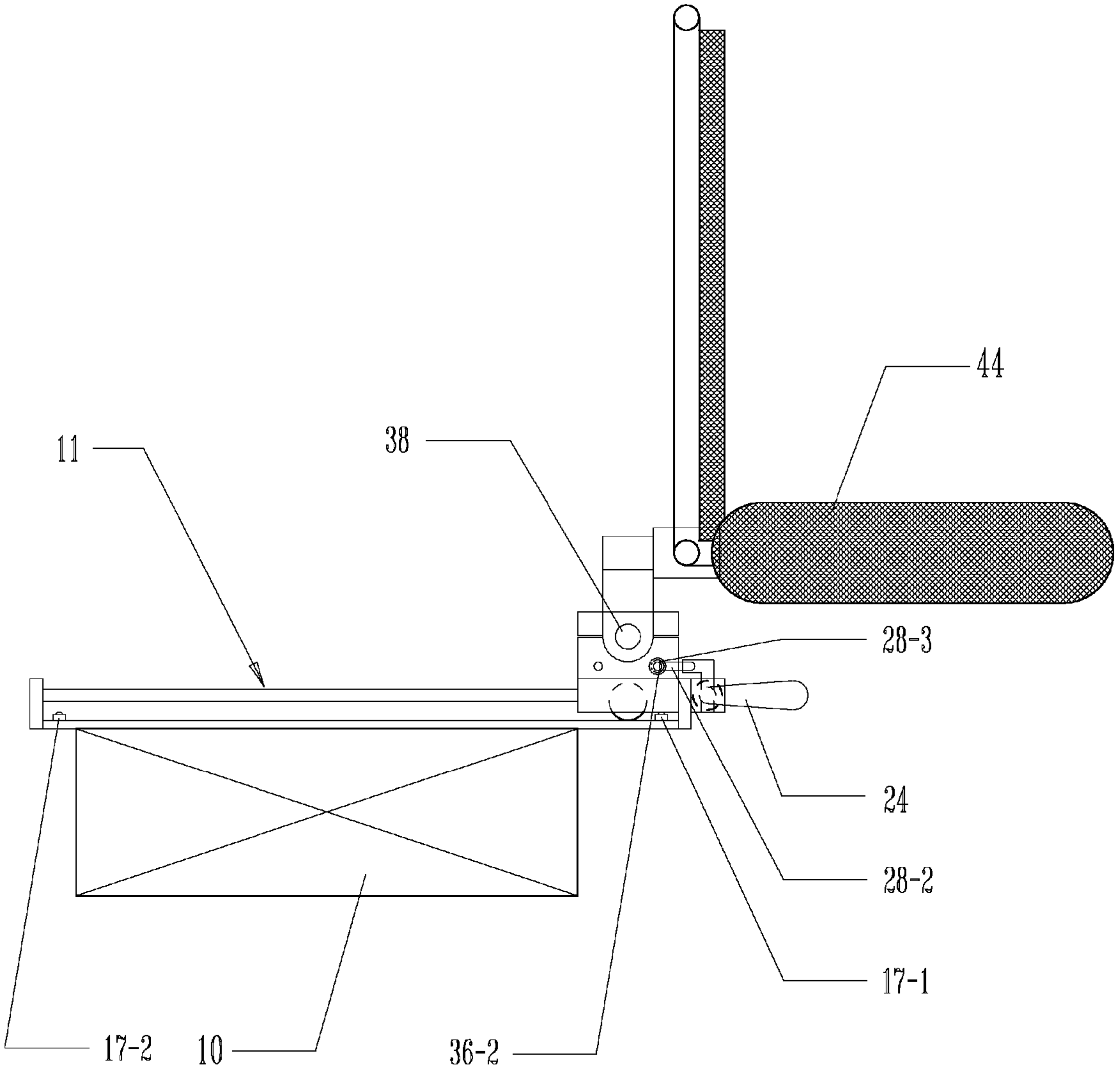
Figure 3C:
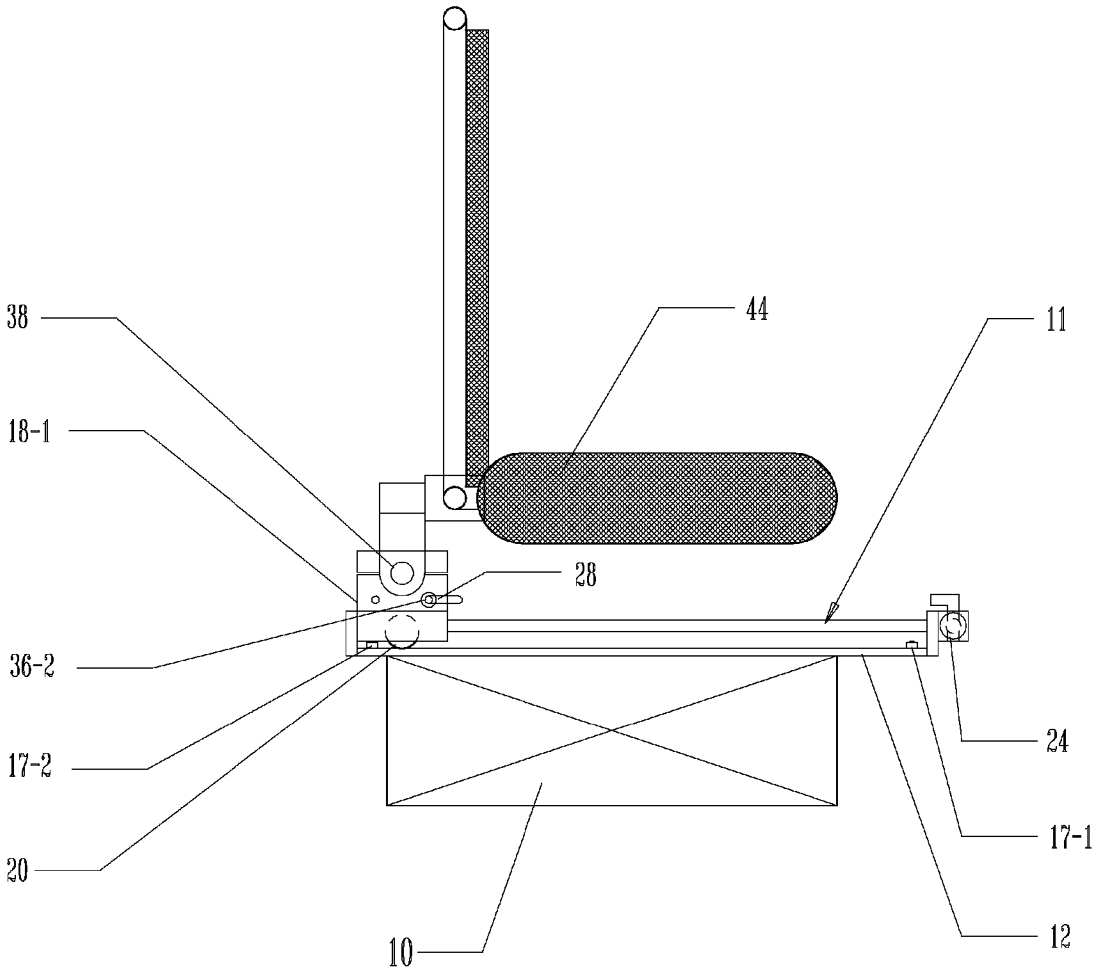

Operation—FIGS. 2, 3A, 3B, 3C, 5, 6 and 7A, 7B, 7C As illustrated in FIG. 3A storage apparatus 10 is in storage position behind wheelchair 44. With the handle member 24 in the "up" position the storage apparatus is prevented from rotating by locking mechanism 28 while the force of the lock plunger 17-1 on bearing section 18-1 prevents sliding of the storage apparatus. The operator of the wheelchair moves down handle member 24, which at the same time moves lock activator 26. The lock activator pressing on the L shaped lock pin 28-2 moves it up and out of the lock hole 36-1. The entire slide mechanism 11 with storage apparatus 10 attached to arm member 12 is free to rotate on shaft 38. The handle which is now in "down" position enables the operator, using mechanical advantage, to rotate the storage apparatus until it is parallel to the armrest of the wheelchair as shown in FIG. 3B. Raising handle member 24 to "up" position will terminate its action on the lock pin 28-2. Force of spring 28-3 will engage the lock pin 28-2 with lock hole 36-2 as seen in FIG. 5 and the storage apparatus will be prevented from further rotational movement. With handle member 24 in "up" position the storage apparatus with the entire slide mechanism 11, after overcoming the force of lock plunger 17-1, slides towards the access position which is essentially parallel to the armrest of the wheelchair as shown in FIG. 3C. At the end of this movements lock plunger 17-2 engages with the bearing section 18-1 securing the storage apparatus in the access position. In the access position content of the storage apparatus can be accessed by the user. Rotational movement of the storage apparatus is prevented by locking mechanism 28 engaged with the lock hole 36-2 while sliding movement is inhibited by lock plunger 17-2.

To bring the storage apparatus from access to storage position the user will slide the storage apparatus backwards. First the lock plunger's 17-2 force will have to be overcome to free the slide mechanism to slide on block member until another lock plunger 17-1 is engaged as seen in FIG. 3B. In this position handle member 24 needs to be lowered to down position to disengage lock pin 28-2 from lock hole 36-2 and free the storage apparatus with the slide mechanism for rotational movement. When the storage apparatus is placed behind the back of the wheelchair (FIG. 3A) raising the handle will cause the downward movement of lock pin 28-2 which will engage with lock hole 36-1. In this storage position storage apparatus is prevented from rotational motion by locking mechanism 28 while sliding motion is prevented by lock plunger 17-1 as seen in FIG. 2. Lock plungers 17-1 and 17-2 can be adjusted for force to suite individual needs. Due to the placement of the storage apparatus away from the plane of the slide mechanism 11 and slide bar members 16-1 and 16-2 force of gravity creates momentum acting on the slide bar members twisting them and jamming their linear movement in the block member. To counteract this force cam follower 20 interacts with arm member 12 maintaining specified distance of the lower margin of the arm member and the block member.

In the preferred embodiment wheelchair occupant is moving the storage apparatus by his/her own power. Alternatively movement of the storage apparatus from storage to access positions can be accomplished by an electric motor with a drive system. This option is shown in FIG. 6. Rotation of drive slide mechanism 46 is accomplished by using power of pivot motor 48-1. Drive slide mechanism 46 moves by utilizing power of slide motor 48-2. Any type of combination of powered and manual force including means of passive storage of energy (such as spring) can be used as well. One motor only with a system of gears can be also used to slide and pivot slide mechanism. The "power" option would eliminate lock, plungers and handle from the design.

Figure 7B:
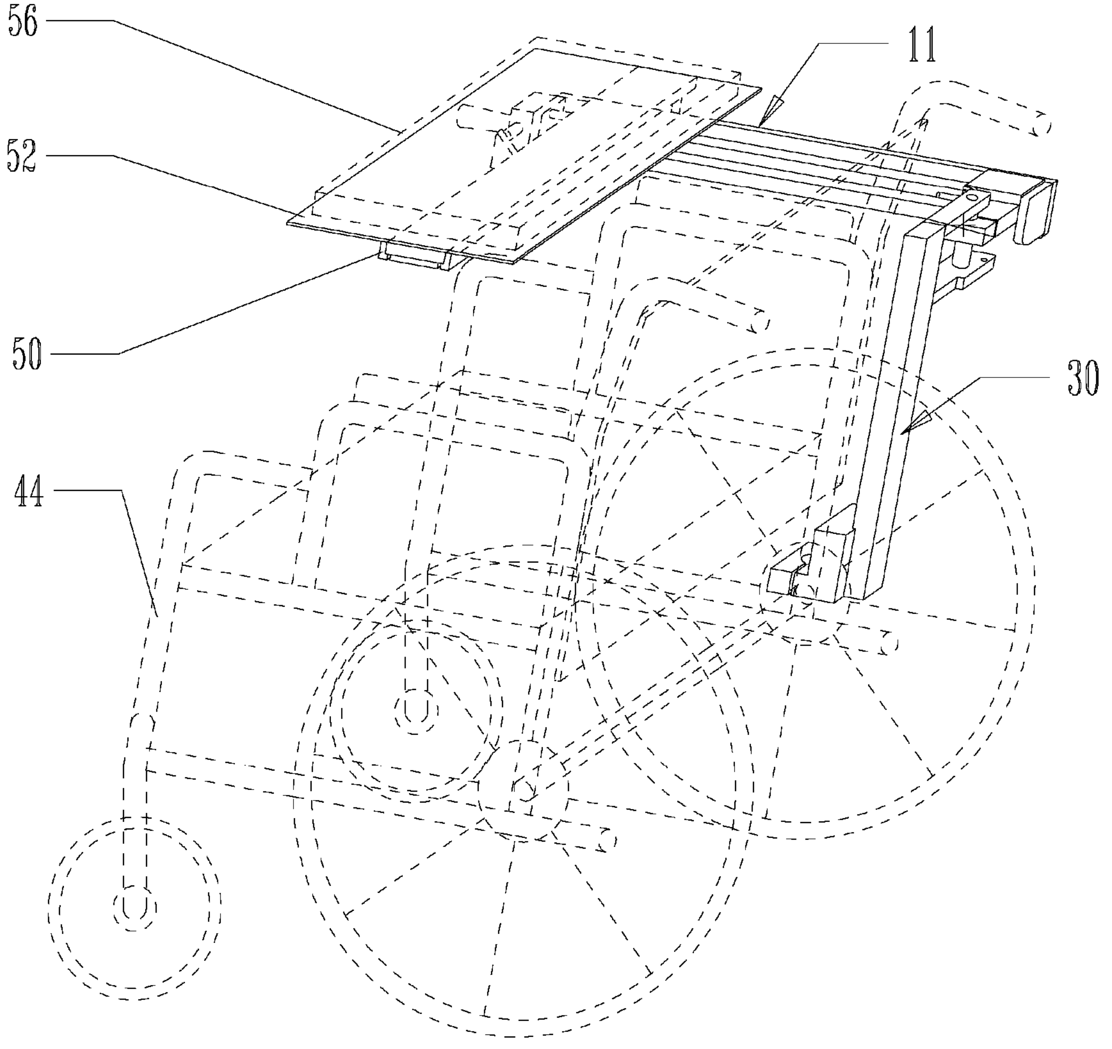
Figure 7C:
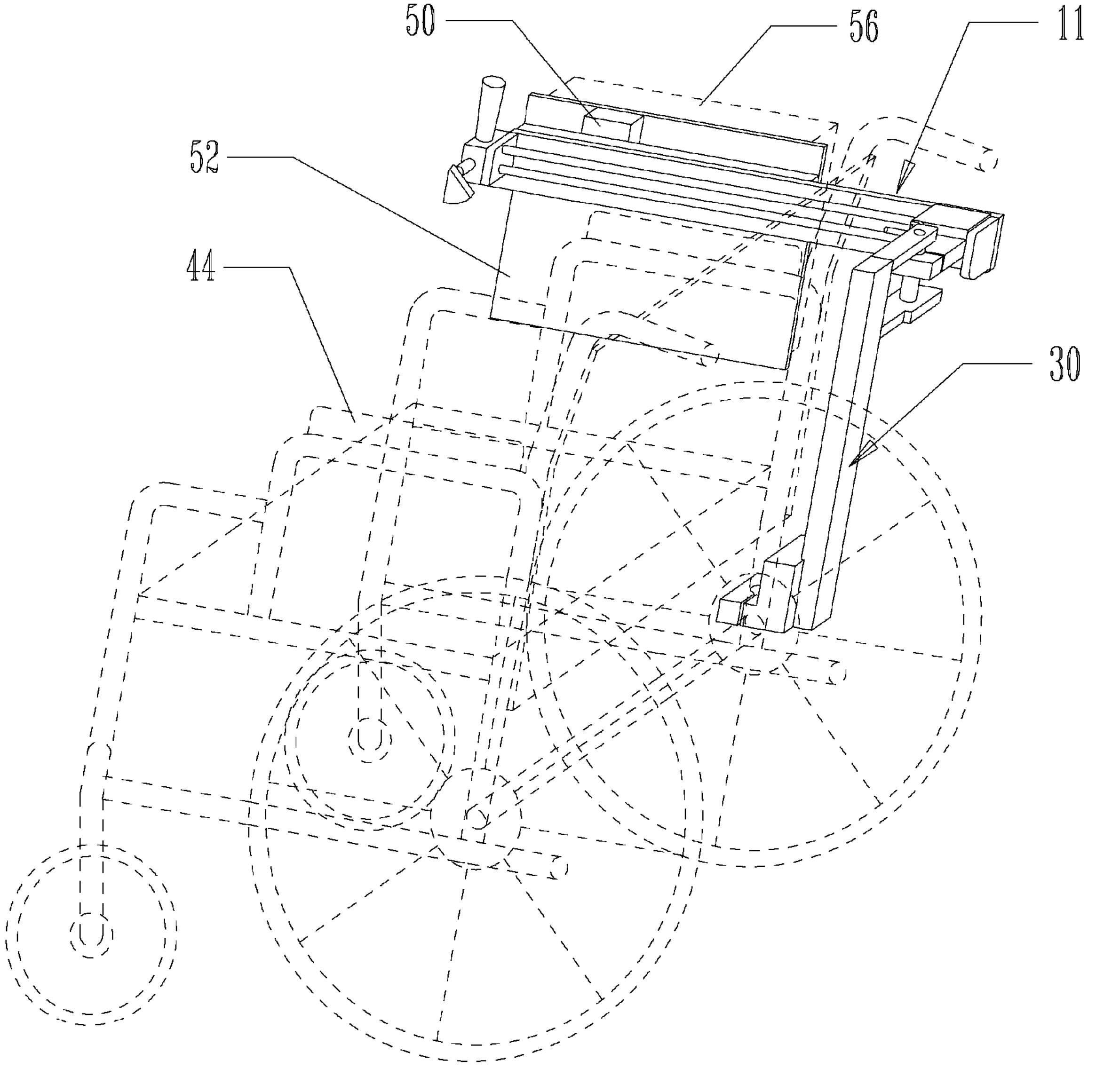

Alternatively storage apparatus can be substituted by a tray system as shown in FIGS. 7A, 7B and 7C. Pivoting frame 50 is utilized to attach tray or table to the slide mechanism 11 to bring that tray or table closer to the lap of the occupant. As seen in FIG. 7A tray 52 is in "extended" position on pivoting frame 50 to provide convenient working area for the occupant. Support 54 is used to stabilize tray 52 against frame of the wheelchair 44. As shown in FIG. 7B tray 52 is moved to "folded" position on pivoting frame 50 and support 54 is folded underneath the tray. The tray with pivoting frame can then be pivoted around slide mechanism 11 to a position alongside armrest of the wheelchair essentially assuming the position of the storage apparatus in the access position as seen in FIG. 7C.

Advantages

From the description above, a number of advantages of our wheelchair bag transportation mechanism become evident:

(a) Wheelchair user will have access to sizable storage for personal use
(b) Storage apparatus placement in the back of the wheelchair will not interfere with wheelchair propulsion and movement
(c) Wheelchair user will have easy access to content of the storage apparatus while remaining seated in the wheelchair
(d) Storage apparatus is securely immobilized in access position using easily engaged and disengaged locks
(e) Storage apparatus is securely immobilized in storage position using easily engaged and disengaged locks
(f) Handle improves ease of operation and affords mechanical advantage for disabled or weak wheelchair operator
(g) Invention is easily attachable to most of the wheelchairs
(h) With addition of simple mechanism storage apparatus can be substituted by a tray or electronic device holder
(i) While moving from storage to access position storage apparatus remains close to wheelchair's armrest enabling the user to use the invention in crowded spaces.

Conclusion, Ramification and Scope

Accordingly, the reader will see that the new method of transporting storage apparatus of this invention can be used to facilitate access to essential belongings of the disabled wheelchair occupant. The storage apparatus can be substituted for any kind of container or apparatus including electronic devices such as portable computers or video players. The invention provides substantial storage space, which is placed behind the wheelchair and does not interfere with wheelchair movement. The invention can be used in crowded places as the storage apparatus remains close to the wheelchair's armrest during movement to and from access position. The invention can be attached to most of the wheelchairs.

While our above description contains many specificities these should not be construed as limitations on the scope of the invention, but rather as an exemplification of one preferred embodiment thereof. Many other variations are possible. For example the invention can be mounted to frame of the wheelchair in many different ways using clamps, bolts or even permanent fasteners. To accommodate different designs of the wheelchairs the mounting system can consist of a set of hinged bars or pipes to properly mount pivot member. Accordingly, the scope of the invention should be determined not by the embodiments illustrated but by the appended claims and their legal equivalents, rather than by the examples given.

We claim:

1. A combination of a wheelchair and a storage apparatus comprising:

a wheelchair having a wheelchair frame including a seat portion, a back support portion, and at least two wheels; a storage apparatus adapted to be placed adjacent and behind said back support portion when not in use and is movable into a position adjacent to said seat portion for access when desired; and an arm member attached to said storage apparatus and pivotally attached to said wheelchair frame, such that said storage apparatus can be moved between a position adjacent and behind said back support portion and a position adjacent to said seat portion and one of said at least two wheels; and further comprising a pivot member that is attached to said wheelchair frame and is adapted to pivot said arm member and storage apparatus together substantially 90 degrees horizontally from said position adjacent and behind said back support portion to a position that is substantially parallel to one of said at least two wheels, and wherein said arm member is attached to said pivot member via a slide bar mechanism adapted to move said storage apparatus and arm member together linearly with respect to said pivot member and to said position that is adjacent to said seat portion and the one of said at least two wheels.

2. The combination as set forth in claim 1, wherein said slide bar mechanism consists of a slide bar member attached to said arm member, and a block member that is attached to said pivot member and slidably interconnected with said slide bar member, such that said arm member moves linearly and pivots with respect to said wheelchair frame.

3. The combination as set forth in claim 2, further comprising a handle member attached to one end of said arm member and is adapted to aid in the pivoting and linear movements of said storage apparatus.

4. The combination as set forth in claim 3, wherein said arm member further comprises a locking mechanism that is controlled by said handle member, such that said arm member can be locked in said position adjacent and behind said back support portion, locked in said position substantially parallel to one of said at least two wheels, and locked in said position adjacent to said one of said at least two wheels.

5. The combination as set forth in claim 1, wherein said storage apparatus is a bag member having a substantially square shape with one corner deformed for maneuverability around the one of said at least two wheels.

6. A combination of a wheelchair and a removably attachable accessory comprising:

a wheelchair having a wheelchair frame including a seat portion, a back support portion, and at least two wheels; an accessory adapted to be placed adjacent and behind said back support portion when not in use and is movable into a position adjacent to said seat portion for access when desired; and an arm member attached to said accessory and pivotally attached to said wheelchair frame, such that said accessory can be moved between a position adjacent and behind said back support portion and a position adjacent to said seat portion and one of said at least two wheels; and further comprising a pivot member that is attached to said wheelchair frame and is adapted to pivot said arm member and accessory together substantially 90 degrees horizontally from said position adjacent and behind said back support portion to a position that is substantially parallel to one of said at least two wheels, and wherein said arm member is attached to said pivot member via a slide bar mechanism adapted to move said accessory and arm member together linearly with respect to said pivot member and to said position that is adjacent to said seat portion and the one of said at least two wheels.

7. The combination as set forth in claim 6, wherein said slide bar mechanism consists of a slide bar member attached to said arm member, and a block member that is attached to said pivot member and slidably interconnected with said slide bar member, such that said arm member moves linearly and pivots with respect to said wheelchair frame.

8. The combination as set forth in claim 7, further comprising a handle member attached to one end of said arm member and is adapted to aid in the pivoting and linear movements of said accessory.

9. The combination as set forth in claim 8, wherein said arm member further comprises a locking mechanism that is controlled by said handle member, such that said arm member can be locked in said position adjacent and behind said back support portion, locked in said position substantially parallel to one of said at least two wheels, and locked in said position adjacent to said one of said at least two wheels.

10. The combination as set forth in claim 6, wherein said accessory is a storage member having a substantially square shape with one corner deformed for maneuverability around the one of said at least two wheels.

11. The combination as set forth in claim 6, wherein said accessory is a tray member having a substantially square shape with one corner deformed for maneuverability around the one of said at least two wheels.

12. An accessory for a wheelchair having a wheelchair frame including a seat portion, a back support portion, and at least two wheels, the accessory being adapted to be placed adjacent and behind said back support portion when not in use and movable into a position adjacent to said seat portion for access when desired; said accessory including a pivoting slide bar mechanism adapted to be pivotally attached to said wheelchair frame, such that the accessory can be moved between a position adjacent and behind said back support portion and a position adjacent to said seat portion and one of said at least two wheels; wherein said slide bar mechanism consists of a slide bar member attached to said accessory, a block member slidably interconnected with said slide bar member, and a pivot member attached to said block member and adapted to be pivotably attached to said wheelchair frame, such that said accessory can be attached to said wheelchair frame and is adapted to move substantially 90 degrees horizontally from said position adjacent and behind said back support portion to a position that is substantially parallel to said one of said at least two wheels; wherein a handle member is attached to one end of said slide bar mechanism and is adapted to aid in the pivoting and linear movements of said accessory; and wherein the slide bar mechanism further comprises a locking mechanism that is controlled by said handle member, such that said slide bar mechanism is capable of being locked in said position adjacent and behind said back support portion, locked in said position substantially parallel to one of said at least two wheels, and locked in said position adjacent to said one of said at least two wheels.

13. The accessory as set forth in claim 12, wherein said accessory is a bag member having a substantially square shape with one corner deformed for maneuverability around the one of said at least two wheels.

14. The accessory as set forth in claim 12, wherein said accessory is a tray member having a substantially square shape with one corner deformed for maneuverability around the one of said at least two wheels.

* * * * *